(12) United States Patent
Ma

(10) Patent No.: US 11,539,798 B2
(45) Date of Patent: Dec. 27, 2022

(54) INFORMATION PROCESSING METHOD AND ELECTRONIC DEVICE

(71) Applicant: Lenovo (Beijing) Co., Ltd., Beijing (CN)

(72) Inventor: Binqiang Ma, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 193 days.

(21) Appl. No.: 16/913,838

(22) Filed: Jun. 26, 2020

(65) Prior Publication Data
US 2020/0412812 A1 Dec. 31, 2020

(30) Foreign Application Priority Data

Jun. 28, 2019 (CN) .......................... 201910574666.0

(51) Int. Cl.
*H04L 67/125* (2022.01)
*G06F 3/01* (2006.01)
*H04L 67/52* (2022.01)
*G16Y 10/75* (2020.01)
*G16Y 40/60* (2020.01)

(52) U.S. Cl.
CPC ............ *H04L 67/125* (2013.01); *G06F 3/013* (2013.01); *H04L 67/52* (2022.05); *G16Y 10/75* (2020.01); *G16Y 40/60* (2020.01)

(58) Field of Classification Search
CPC .............. H04N 5/23229; G02B 27/017; G06T 19/006; G06F 3/04842; G06F 3/16; G06F 3/017; G06F 3/013
See application file for complete search history.

(56) References Cited

U.S. PATENT DOCUMENTS

| | | | | |
|---|---|---|---|---|
| 9,508,194 B1* | 11/2016 | Worley, III | ........... | G06F 3/0304 |
| 10,186,086 B2* | 1/2019 | Giraldi | ....................... | G06F 3/16 |
| 10,403,046 B2* | 9/2019 | Pinti | ..................... | G06F 3/0304 |
| 10,854,171 B2* | 12/2020 | Clarke | ................... | G09G 3/003 |
| 10,969,486 B2* | 4/2021 | Thoresen | ............... | G01S 13/876 |
| 11,145,122 B2* | 10/2021 | Kollencheri Puthenveettil | ........... | H04L 67/131 |
| 11,277,658 B1* | 3/2022 | Etwaru | ............... | H04N 21/8352 |
| 2012/0272179 A1* | 10/2012 | Stafford | .................. | G06F 3/012 345/157 |
| 2014/0087661 A1 | 3/2014 | Kim et al. | | |
| 2015/0312561 A1* | 10/2015 | Hoof | ..................... | H04N 13/383 348/46 |
| 2016/0049011 A1* | 2/2016 | Kasahara | ............. | G06F 3/04815 345/633 |

(Continued)

FOREIGN PATENT DOCUMENTS

| CN | 102301738 A | 12/2011 |
|---|---|---|
| CN | 103971502 A | 8/2014 |

(Continued)

*Primary Examiner* — William Lu
(74) *Attorney, Agent, or Firm* — Anova Law Group, PLLC

(57) ABSTRACT

An information processing method for an electronic device includes obtaining orientation information of the electronic device, determining an area having a specified angle based on the orientation information, identifying one or more Internet of Things (IoT) device in the area, determining that the electronic device has an authority to display information of the one or more IoT device, and receiving and displaying the information of the one or more IoT device.

20 Claims, 8 Drawing Sheets

(56) References Cited

U.S. PATENT DOCUMENTS

| | | | |
|---|---|---|---|
| 2016/0162082 A1* | 6/2016 | Schwesinger | G06F 3/012 |
| | | | 345/173 |
| 2017/0061694 A1* | 3/2017 | Giraldi | H04N 5/23229 |
| 2017/0098453 A1* | 4/2017 | Wright | G06F 3/017 |
| 2018/0012417 A1* | 1/2018 | Haseltine | G06F 3/013 |
| 2018/0054568 A1* | 2/2018 | Sugawara | G09G 5/00 |
| 2018/0073951 A1* | 3/2018 | Venkatraman | G01C 5/06 |
| 2018/0285052 A1* | 10/2018 | Eade | G03H 1/2249 |
| 2019/0121350 A1* | 4/2019 | Celia | H03M 13/353 |
| 2019/0180106 A1* | 6/2019 | Bergendahl | G06V 20/52 |
| 2019/0294239 A1* | 9/2019 | Suzuki | G06F 3/013 |
| 2020/0008110 A1* | 1/2020 | Yousif | H04W 4/02 |
| 2020/0348518 A1* | 11/2020 | Georgiou | G02B 27/0172 |
| 2020/0410769 A1* | 12/2020 | Lee | G06F 3/011 |
| 2021/0027311 A1* | 1/2021 | Arias | H04W 4/029 |

FOREIGN PATENT DOCUMENTS

| | | |
|---|---|---|
| CN | 106257355 A | 12/2016 |
| CN | 106383458 A | 2/2017 |

\* cited by examiner

INFORMATION PROCESSING METHOD AND ELECTRONIC DEVICE

CROSS-REFERENCE TO RELATED DISCLOSURE

The present disclosure claims the priority to Chinese Patent Disclosure Nos. 201910574666.0, entitled "Information Processing Method and Electronic Device", filed on Jun. 28, 2019, the entire content of which is incorporated herein by reference.

TECHNICAL FIELD

The present disclosure relates to the field of electronic technology, in particular to an information processing method and a related electronic device.

BACKGROUND

As smart terminal devices and the applications of the Internet of Things (IoT) become more popular, the IoT devices around a smart terminal device used by a user can send IoT device information to the smart terminal device.

Accordingly, existing information processing methods between the devices often cause the smart terminal devices used by the user to receive too much information. It is inconvenient for the user to quickly obtain the needed information from the large volume of received information.

SUMMARY

According to one aspect of the present disclosure, an information processing method for an electronic device is provided. The method includes obtaining orientation information of the electronic device, determining an area having a specified angle based on the orientation information, identifying one or more Internet of Things (IoT) devices in the area, determining that the electronic device has an authority to display information of the one or more IoT devices, and receiving and displaying the information of the one or more IoT devices.

According to another aspect of the present disclosure, an electronic device is provided. The electronic device includes an acquisition module configured to obtain orientation information of the electronic device, a first determination module configured to determine an area having a specified angle based on the orientation information, a second determination module configured to identify one or more Internet of Things (IoT) devices in the area, a third determination module configured to determine that the electronic device has the authority to display information of the one or more IoT devices, and a display module configured to receive and display the information of the one or more IoT devices.

According to further aspect of the present disclosure, an electronic device is provided. The electronic device includes a memory and a processor. The memory stores a computer program executable on the processor, and when executed, the processor is configured to: obtain orientation information of the electronic device; determine an area having a specified angle based on the orientation information; identify one or more Internet of Things (IoT) devices in the area; determine that the electronic device has an authority to display information of the one or more IoT devices; and receive and display the information of the one or more IoT devices.

BRIEF DESCRIPTION OF THE DRAWINGS

In order to more clearly explain the embodiments of the present disclosure or the technical solutions in the existing technology, the following will briefly introduce the drawings required in the embodiments or the description of the existing technology. Apparently, the drawings in the following description are only embodiments of the present disclosure. For a person of ordinary skill in the art, other drawings may be obtained according to the provided drawings without any creative efforts.

DETAILED DESCRIPTION OF THE EMBODIMENTS

The technical solutions in the embodiments of the present disclosure will be described clearly and completely in conjunction with the drawings in the embodiments of the present disclosure. Apparently, the described embodiments are only a part of the embodiments of the present disclosure, but not all the embodiments. Based on the embodiments in the present disclosure, all other embodiments obtained by those of ordinary skill in the art without making creative efforts fall within the scope of the disclosure.

Figure 1:
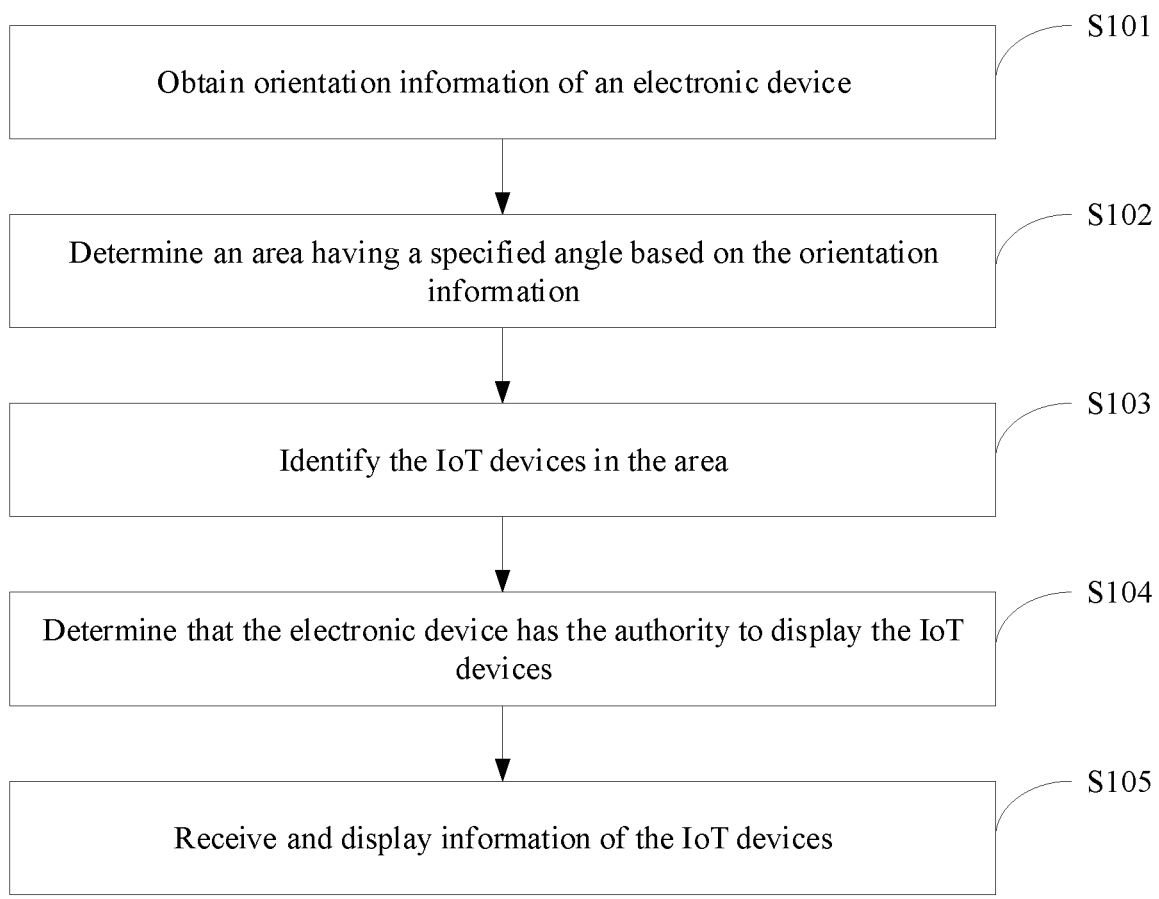
FIG. 1 is a flowchart of an information processing method according to an embodiment of the present disclosure.

As shown in FIG. 1, a flowchart of an information processing method is provided according to an embodiment of the present disclosure. The method is applied to an electronic device. The electronic device may be an intelligent device such as a smart phone, a tablet computer, or a virtual reality (VR) device. The method may include the following steps:

S101: Obtaining orientation information of an electronic device.

When the user needs to obtain the relevant information of the IoT device through the electronic device, current orientation information of the electronic device may be obtained first; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device itself, such as a magnetoresistive (MR) sensor.

S102: Determining an area having a specified angle based on the orientation information.

After the orientation information of the electronic device is obtained, an area having a specified central angle can be determined based on the obtained orientation information, with the electronic device being a center and the orientation of the electronic device being a centerline. For example, when the specified angle is 120° and the orientation of the electronic device is 40° North-East, an area having a specified angle of 120° can be determined by setting the electronic device to be the center and the 40° North-East orientation to be the centerline. In some embodiments, the area may be a fan shaped area with a central angle, e.g., 120°.

It should be noted that the specified angle can be flexibly set according to actual conditions. For example, different specified angles can be set according to different types of electronic devices, or different specified angles can be set according to different needs of the user.

S103: Identifying the Internet of Things (IoT) devices in the area.

After the area having the specified angle is determined based on the orientation information of the electronic device, the IoT devices in the area having the specified angle may be further identified. There may be several IoT devices in the area having the specified angle.

It should be noted that, when identifying the IoT devices in the area, one implementation manner may be that the electronic device sends the determined information of the area having the specified angle to a cloud server, and the cloud server can identify the IoT devices in the area having the specified angle according to the received information of the area having the specified angle, and feedback the information of the IoT device within the area having the specified angle to the electronic device. The information of the IoT device fed back by the cloud server may be the location information of the IoT device.

S104: Determining that the electronic device has the authority to display the IoT devices.

After the IoT devices in the area are identified, it can be further determined whether the electronic device has the authority to display the IoT devices in the area.

S105: Receiving and displaying information of the IoT devices.

When determining that it has the authority to display the IoT devices in the area having the specified angle, the electronic device receives and displays the information of the authorized IoT.

It should be noted that, when receiving and displaying the information of the IoT devices, one implementation manner may be that the IoT devices within the area that the electronic device has the authority to display send the relevant information of the device to a cloud server, and the cloud server can then send the received relevant information sent by the IoT devices to the electronic device for display. Another implementation manner may be that the IoT devices within the area that the electronic device has the authority to display establish connections with the electronic device. After the connection is established, the information related to the IoT devices may be sent to electronic devices for display.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, in the above embodiment, when the user needs to obtain the relevant information of the IoT devices through the electronic device, the user first can obtain the orientation information of the electronic device, then the area having the specified angle based on the orientation information can be identified. The IoT devices within the area can be identified, and it can be determined that the electronic device has the authority to display the IoT devices, and finally the information of the IoT devices can be received and displayed. In the present disclosure, the IoT devices of which the electronic device can obtain information can be determined based on the orientation, the specified angle of the electronic device, and the authority to display the IoT devices. Accordingly, it can be more convenient for the user of the electronic device to timely obtain the required information of the IoT devices, which improves the user experience.

Figure 2:
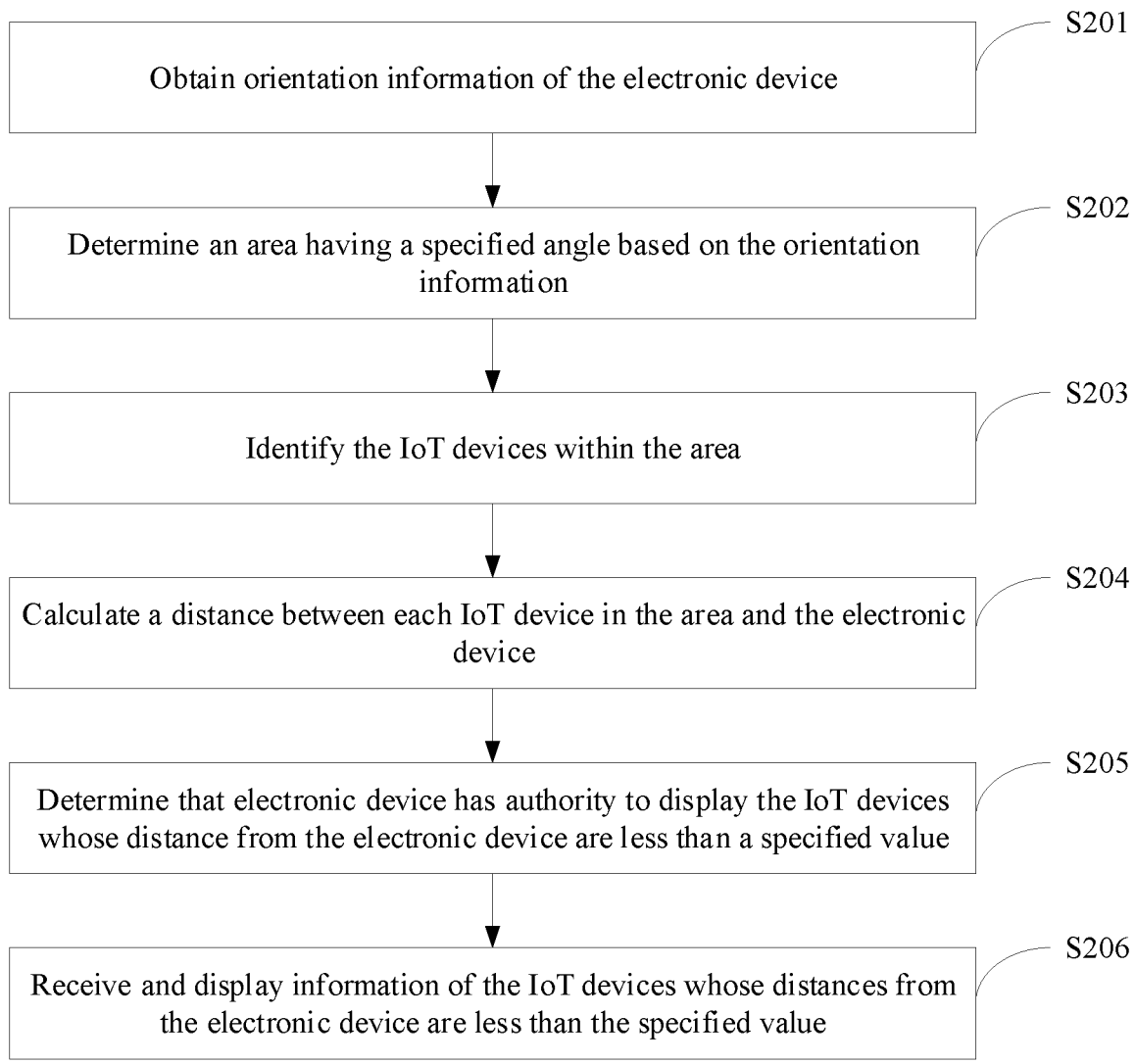
FIG. 2 is a flowchart of the information processing method according to another embodiment of the present disclosure.

As shown in FIG. 2, a flowchart of the information processing method according to another embodiment of the present disclosure is provided. The method is applied to an electronic device. The electronic device may be an intelligent device such as a smart phone, a tablet computer, or a VR device. The method may include the following steps:

S201: Obtaining orientation information of the electronic device.

When the user needs to obtain the relevant information of the IoT devices through the electronic device, current orientation information of the electronic device may be obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

S202: Determining an area having a specified angle based on the orientation information.

After the orientation information of the electronic device is obtained, the area having the specified angle can be determined based on the obtained orientation information, with the electronic device being a center and the orientation of the electronic device being a centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

S203: Identifying the IoT devices within the area.

After the area having the specified angle is determined based on the orientation information of the electronic device, the IoT devices within the area having the specified angle can be further identified. There may be several IoT devices within the area having the specified angle.

It should be noted that, when identifying the IoT devices within the area, one implementation manner may be that the electronic device sends the determined information of the area having the specified angle to a cloud server, and the cloud server can identify the IoT devices within the area having the specified angle according to the received information of the area having the specified angle, and feedback the information of the IoT devices within the area having the specified angle to the electronic device. The information of the IoT devices fed back by the cloud server may be the location information of the IoT devices.

S204: Calculating a distance between each IoT device in the area and the electronic device.

After the IoT devices within the area are identified, it can be further determined whether the electronic device has the authority to display the IoT devices in the area.

When determining whether the electronic device has the authority of the IoT devices in the display area, the distance between each IoT device in the area and the electronic device can be calculated first. One method to calculate the distance between each IoT device it the area and the electronic device may be that the electronic device obtains the location information of each IoT device in the area through the cloud server, based on its own location information, and calculate the distance between each IoT device in the area and the electronic device.

S205: Determining that electronic device has authority to display the IoT devices whose distances from the electronic device are less than a specified value.

After calculating the distance between each IoT device in the area and the electronic device, the IoT devices whose distances from the electronic device are less than the specified value can be determined to be the IoT device that the electronic device has the authority to display. For example, the IoT device whose distances from the electronic device are less than 10 meters can be determined to be the IoT devices that the electronic device has the authority to display.

It should be noted that the specified value can be flexibly set according to the actual situation.

S206: Receiving and displaying information of the IoT devices whose distances from the electronic device are less than the specified value.

When determining the IoT devices within the area having the specified angle that the electronic device has the authority to display, i.e., after the IoT devices within the area having the specified angle whose distances from the electronic device are less than the specified value are determined, the information of the IoT devices whose distances from the electronic device are less than the specified value can be received and displayed.

It should be noted that, when receiving and displaying the information of the IoT devices whose distance from the electronic device are less than the specified value, one implementation manner may be that the IoT devices within the area whose distances from the electronic device are less than the specified value send the relevant information of the device to the cloud server, and the cloud server can then send the received relevant information sent by the IoT devices to the electronic device for display. Another implementation manner may be that the IoT devices within the area whose distances from the electronic device are less than the specified value establish connections with the electronic device, and may send information related to the IoT devices to the electronic device for display after establishing the connection.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, based on the above method embodiment, in this embodiment, it can be determined that the electronic device has the authority to display the IoT devices whose distances from the electronic device being less than the specified value by calculating the distance between the IoT device of each area and the electronic device, and the information of the IoT devices whose distances from the electronic device are less than the specified value may be received and displayed. Accordingly, it can be more convenient for the user of the electronic device to obtain the required IoT device information, which improves the user experience.

Figure 3:
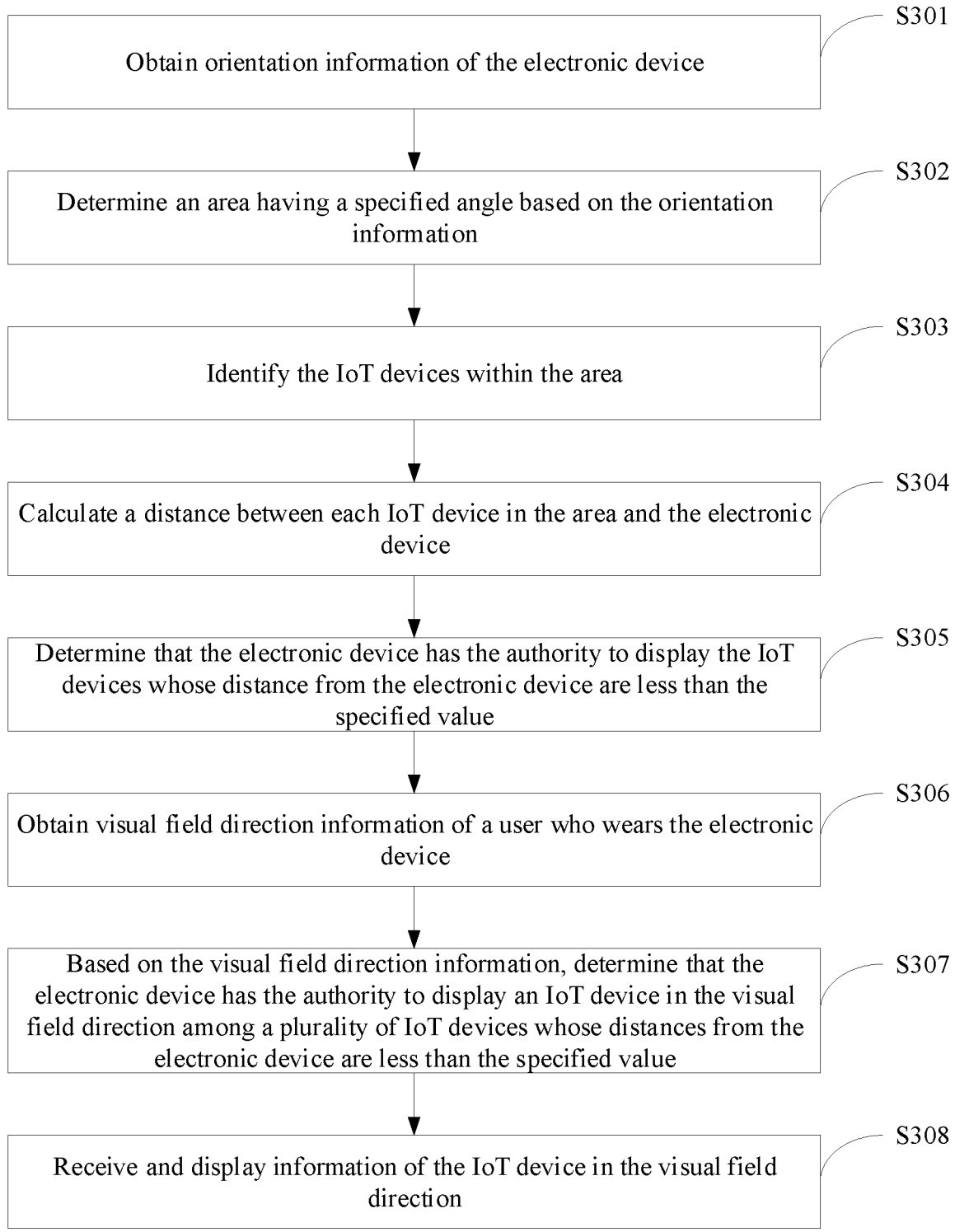
FIG. 3 is a flowchart of the information processing method according to another embodiment of the present disclosure.

As shown in FIG. 3, a flowchart of the information processing method according to another embodiment of present disclosure. The method can be applied to an electronic device. The electronic device may be an intelligent device such as a smart phone, a tablet computer, or a VR device. The method may include the following steps:

S301: Obtaining orientation information of the electronic device.

When the user needs to obtain the relevant information of the IoT device through the electronic device, current orientation information of the electronic device may be obtained; that is, the orientation of the electronic device can be determined first. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device itself, such as a magnetoresistive sensor.

S302: Determining an area having a specified angle based on the orientation information.

After the orientation information of the electronic device is obtained, an area having a specified angle can be determined based on the obtained orientation information, with the electronic device being a center and the orientation of the electronic device being a centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

S303: Identifying the IoT devices within the area.

After the area having the specified angle is determined based on the orientation information of the electronic device, the IoT devices in the area having the specified angle can be further identified. There may be several IoT devices in the area having the specified angle.

It should be noted that, when identifying the IoT devices in the area, one implementation manner may be that the electronic device sends the determined information of the area having the specified angle to a cloud server, and the cloud server can identify the IoT devices in the area having the specified angle according to the received information of to the specified angle, and the information of the IoT devices in the area having the specified angle may be fed back to the electronic device. The information of the IoT devices fed back by the cloud server may be the location information of the IoT devices.

S304: Calculating a distance between each IoT device in the area and the electronic device.

After the IoT devices in the area are identified, it can be further determined whether the electronic device has the authority to display the IoT devices in the area.

When determining whether the electronic device has the authority to display the IoT devices in the display area, the distance between each IoT device in the area and the electronic device can be calculated first. One implementation manner to calculate the distance between each IoT device in the area and the electronic device may be that the electronic device obtains location information of each IoT device within the area through the cloud server, and calculate the distance between each IoT device in the area and the electronic device based on location information of the electronic device.

S305: Determining that the electronic device has the authority to display the IoT devices whose distances from the electronic device are less than the specified value.

After calculating the distance between each IoT device within the area and the electronic device, the IoT device whose distances from the electronic device are less than the specified value can be determined to be the IoT devices that the electronic device has the authority to display. For example, the IoT devices whose distance from the electronic device are less than 10 meters can be determined to be the IoT devices that the electronic device has the authority to display.

It should be noted that the specified value can be flexibly set according to the actual situation.

S306: Obtaining visual field direction information of a user who wears the electronic device.

After the IoT devices whose distances from the electronic device are less than the specified value are determined, the user's intention can be further combined to more accurately determine the IoT device required by the user.

When determining the user's intention, visual field direction information of the user who wears the electronic device can be first determined, that is, the direction of line of sight of the user. The information of the expected IoT device in the direction of the line of sight can be obtained by the user's intent determined by the line of sight direction.

S307: Based on the visual field direction information, determining that the electronic device has the authority to display the IoT device in the visual field direction among a plurality of IoT devices whose distances from the electronic device are less than the specified value.

After obtaining the visual field direction information of the user who wears the electronic device, the IoT device in the user's visual field direction whose distance from the electronic device is less the specified value can be determined to be the IoT device that the electronic device has the authority to display.

S308: Receiving and displaying information of the IoT device in the visual field direction.

When determining the IoT devices within the area having the specified angle that the electronic device has the authority to display; that is, and after the IoT devices within the area having the specified angle in the user's visual field direction whose distances from the electronic device are less than the specified value are determined, and the information of the IoT device in the direction of the user's visual field whose distance from the electronic device is less than the specified value can be received and displayed.

It should be noted that, when receiving and displaying information of the IoT device in the user's visual field direction whose distance from the electronic device is less than the specified value and, one implementation manner may be that the IoT device within the area in the direction of the user's visual field whose distance from the electronic device is less than the specified value sends the relevant information of the device to a cloud server, and the cloud server sends the received relevant information sent by the IoT device to the electronic device for display. Another implementation manner may be that the IoT device within the area in the direction of the user's visual field whose distance from the electronic device is less than the specified value establishes a connection with the electronic device, and sends information related to the IoT device to the electronic device for display after establishing the connection.

In addition, it should be noted that the relevant information sent by the IoT device may be different information of the IoT devices according to the actual situation. For example, different information can be sent according to different types of IoT devices, or different IoT device information can be sent according to different needs of the user.

In summary, in this embodiment, based on the above method embodiment, after determining the IoT device within the area whose distance from the electronic device is less than the specified value, the information of the visual field direction of the user who wears the electronic device can be further obtained to determine the user's intention. The IoT device within the area whose distance from the electronic device is less than the specified value in the direction of the user's visual field can be determined to be the IoT device of which the user desires to obtain the relevant information. Accordingly, it can be more convenient for the user of the electronic device to timely obtain the required information of IoT devices, which improves the user experience.

Specifically, in the above embodiment, one implementation manner of obtaining the information of the visual field direction of the user who wears the electronic device may be: first collecting eye movement information of the user who wears the electronic device, and then determining the information of the visual field direction of the user who wears the electronic device according to the eye movement information.

Specifically, when collecting eye movement information of the user who wears the electronic device, the user's eyeball can be photographed through a camera of the electronic device, to collect the user's eye movement information. For example, when the electronic device is a VR device, when the user wears the VR device, the user's eyeball can be photographed through a camera in the VR device, then the user's eyeball movement information can be collected.

Figure 4:
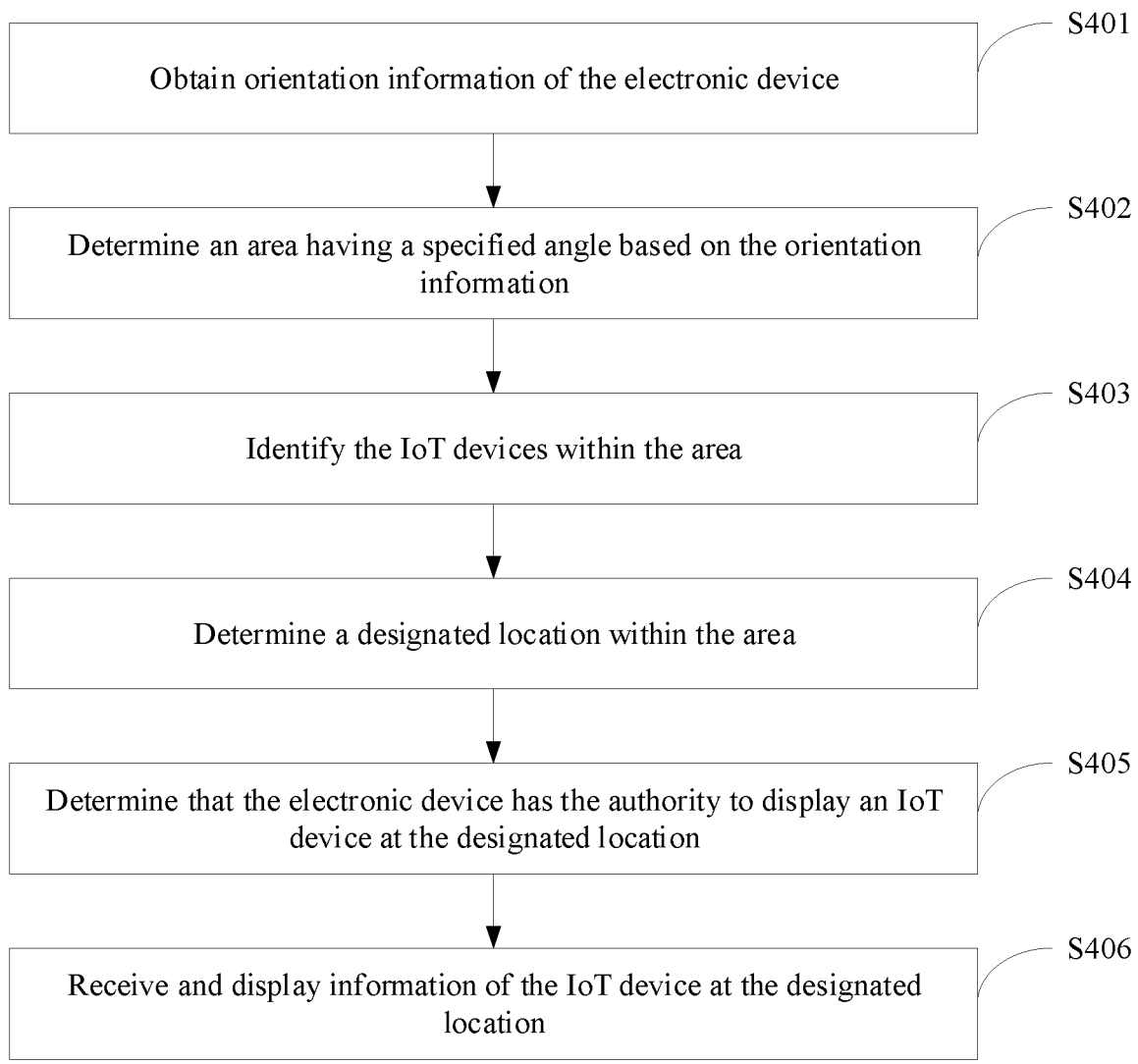
FIG. 4 is a flowchart of the information processing method according to another embodiment of the present disclosure.

As shown in FIG. 4, a flowchart of the information processing method according to another embodiment of the present disclosure is provided. The method is applied to an electronic device. The electronic device may be an intelligent device such as a smart phone, a tablet computer, or a VR device. The method may include the following steps:

S401: Obtaining orientation information of the electronic device.

When the user needs to obtain the relevant information of the IoT device through the electronic device, current orientation information of the electronic device may be obtained; that is, the orientation of the electronic device can be determined first. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device itself, such as a magnetoresistive sensor.

S402: Determining an area having a specified angle based on the orientation information.

After the orientation information of the electronic device is obtained, an area having a specified angle can be determined based on the obtained orientation information, with the electronic device being a center and the orientation of the electronic device being a centerline. For example, when the specified central angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

S403: Identifying the IoT devices within the area.

After the area having the specified angle is determined based on the orientation information of the electronic device, the IoT devices in the area having the specified angle can be further identified. There may be several IoT devices in the area having the specified angle.

It should be noted that, when identifying the IoT devices in the area, one implementation manner may be that the electronic device sends the determined information of the area having the specified angle to a cloud server, and the cloud server can identify the IoT devices in the area having the specified angle according to the received information of to the specified angle, and the information of the IoT devices in the area having the specified angle may be fed back to the electronic device. The information of the IoT devices fed back by the cloud server may be the location information of the IoT devices.

S404: Determining a designated location within the area.

After the IoT devices within the area are determined, it can be further determined whether the electronic device has the authority to display the IoT devices within the area.

When determining whether the electronic device has the authority to display the IoT devices within the display area, it can be first determined whether there is a designated location in the area. The designated location can be flexibly set according to different needs. For example, a crossroad, a T-junction, etc., can be determined to be the designated location.

S405: Determining that the electronic device has the authority to display an IoT device at the designated location.

After the designated location is determined in the area, an IoT device at the designated location can be further determined to be the IoT device that the electronic device has the authority to display.

S406: Receiving and displaying information of an IoT device at the designated location.

When an IoT device that the electronic has the authority to display can be determined at the designated location within the area having the specified angle, the information of the IoT device at the designated location can be received and displayed.

It should be noted that, when receiving and displaying the information of the IoT device at the designated location, one implementation manner may be that the IoT device at the designated location sends the information related to the device to a cloud server, and the cloud server then sends the relevant information sent by the IoT device to the electronic device for display. Another implementation manner may be that the IoT device at the designated location establishes a connection with the electronic device, and sends the information related to the IoT device to electronic device for display after establishing the connection.

In addition, it should be noted that the relevant information sent by the IoT device may be different information of the IoT devices according to the actual situation. For example, different information can be sent according to different types of IoT devices, or different IoT device information can be sent according to different needs of the user.

In summary, based on the above method embodiment, in this embodiment, the electronic device that has the authority to display the IoT device at the designated location can be determined by determining the designated location within the area having the specified angle, and the information of the IoT device at the designated location can be received and displayed, so that it can be more convenient for the user who uses the electronic devices to obtain the required information of the IoT device in time, which improves the user experience.

Figure 5:
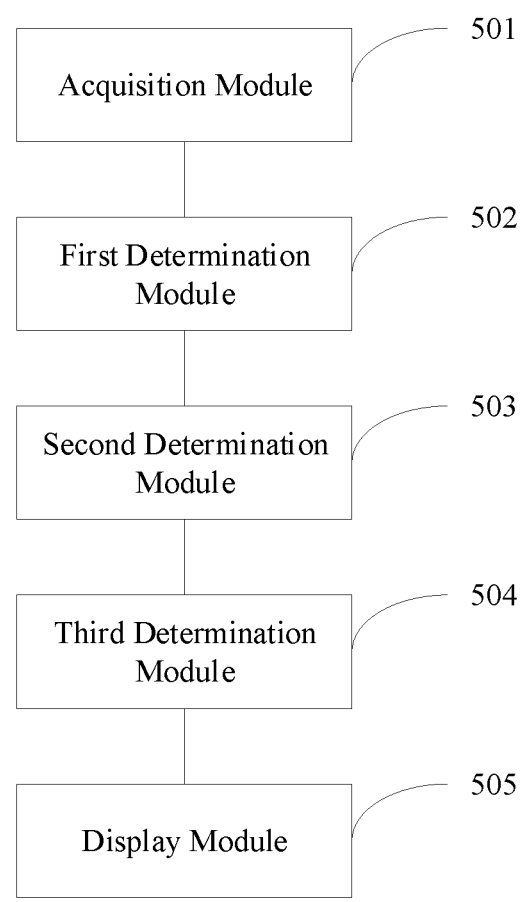
FIG. 5 is a schematic diagram of an electronic device according to an embodiment of the present disclosure.

As shown in FIG. 5, a schematic diagram of an electronic device according to an embodiment of the present disclosure is provided. The electronic device may be an intelligent device such as a smart phone, a tablet computer, or a VR device. The electronic device may include:

Acquisition module 501: configured to acquire orientation information of the electronic device.

When the user needs to obtain the relevant information of the IoT device through the electronic device, current orientation information of the electronic device may be first obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

First determination module 502: configured to determine an area having a specified angle based on the orientation information.

After the orientation information of the electronic device is obtained, an area having a specified central angle can be determined based on the obtained orientation information with the electronic device being a center and the orientation of the electronic device being a centerline. For example, when the specified central angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

Second determination module 503: configured to identify the IoT devices within the area.

After the area having the specified angle is determined based on the orientation information of the electronic device, the IoT devices within the area having the specified angle can be further identified. There may be several IoT devices in the area of the circular sector having the specified angle.

It should be noted that, when determining the IoT devices in the area, one implementation manner may be that the electronic device sends the determined information of the area having the specified angle to a cloud server, and the cloud server identifies the IoT devices within the area having the specified angle according to the information of the area having the specified angle, and feedbacks the information of the IoT devices within the area having the specified angle to the electronic device. The information of the IoT devices fed back by the cloud server may be the location information of the IoT devices.

Third determination module 504: configured to determine that the electronic device has the authority to display the IoT devices.

After the IoT devices within the area are determined, it can be further determined whether the electronic device has the authority to display the IoT devices within the area.

Display module 505: configured to receive and display the information of the IoT devices.

When determining the electronic device has the authority the display the IoT device in the area having the specified angle, the information of the authorized IoT device may be received and displayed.

It should be noted that, when receiving and displaying the information of the IoT device, one implementation manner may be that the IoT devices within the area that the electronic device has the authority to display send the relevant information of the device to a cloud server, and the cloud server then sends the relevant information sent by the IoT devices to the electronic device for display. Another implementation manner may be that the IoT devices within the area that the electronic device has the authority to display establish connections with the electronic device, and send the information related to the IoT devices to the electronic device for display after the connection is established.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, in the above embodiment, when the user needs to obtain relevant information of IoT devices through an electronic device, the orientation information of the electronic device may be first obtained, and then an area having a specified angle based on the orientation information can be determined. The IoT devices that the electronic device has the authority to display can be determined, and the information of the IoT devices may be received and displayed. In the present disclosure, the IoT devices of which the electronic device can obtain information can be determined according to the orientation of the electronic device, the specified angle and the authority to display the IoT. Accordingly, it can be convenient for the user of electronic device to timely obtain the required information of the IoT devices, which improves the user experience.

Figure 6:
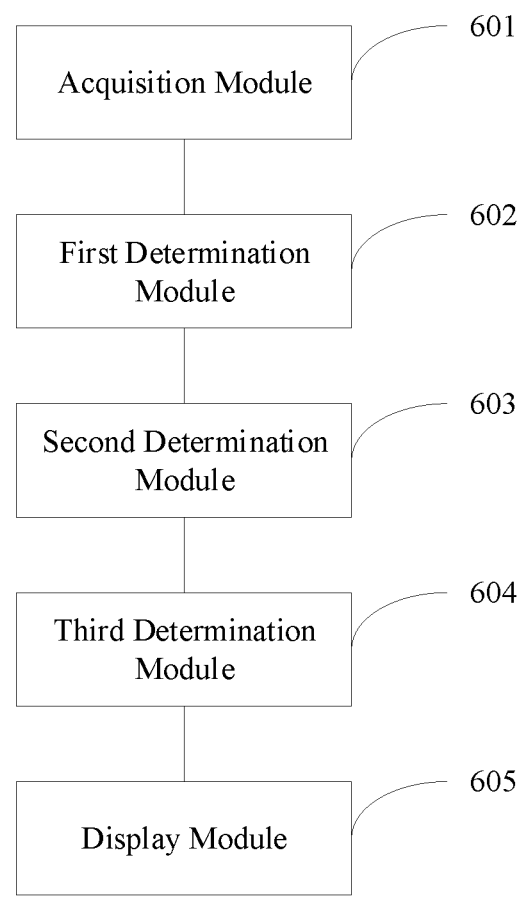
FIG. 6 is a schematic diagram of the electronic device according to another embodiment of the present disclosure.

As shown in FIG. 6, a schematic diagram of the electronic device according to another embodiment of the present disclosure is provided. The electronic device may be an intelligent device such as a smart phone, a tablet computer, or a VR device. The electronic device may include:

Acquisition module 601: configured to obtain orientation information of the electronic device.

When the user needs to obtain the relevant information of the IoT device through the electronic device, current orientation information of the electronic device may be first obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

First determination module 602: configured to determine an area having a specified angle based on the orientation information.

After the orientation information of the electronic device is obtained, an area having a specified angle can be determined based on the obtained orientation information with the electronic device being a center and the orientation of the electronic device being a centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

Second determination module 603: configured to identify the IoT devices within the area.

After the area having the specified angle is determined based on the orientation information of the electronic device, the IoT devices within the area having the specified angle can be further identified. There may be several IoT devices in the area having the specified angle.

It should be noted that, when identifying the IoT devices in the area, one implementation manner may be that the electronic device sends the determined information of the area having the specified angle to a cloud server, and the cloud server identifies the IoT devices within the area having the specified angle according to the information of the area having the specified angle, and feedbacks the information of the IoT devices within the area having the specified angle to the electronic device. The information of the IoT devices fed back by the cloud server may be the location information of the IoT devices.

Third determination module 604: configured to calculate a distance between each IoT device in the area and the electronic device.

After the IoT devices within the area are determined, it can be further determined whether the electronic device has the authority to display the IoT devices within the area.

When determining whether the electronic device has the authority to display the IoT devices in the display area, the distance between each IoT device in the area and the electronic device can be calculated first. One method to calculate the distance between each IoT device in the area and the electronic device may be that the electronic device obtains the location information of each IoT device in the area through a cloud server, and calculate the distance between each IoT device in the area and the electronic device based on the location information of the electronic device.

The third determination module 604 is further configured to determine that the electronic device has the authority to display the IoT devices whose distance from the electronic device are less than a specified value.

After calculating the distance between each IoT device within the area and the electronic device, the IoT devices whose distances from the electronic device are less than the specified value can be determined to be the IoT devices that the electronic device has the authority to display. For example, the IoT devices whose distances from the electronic device are less than 10 meters may be determined to be the IoT devices that the electronic device has the authority to display.

It should be noted that the specified value can be flexibly set according to the actual situation.

Display module 605: configured to receive and display the information of the IoT devices whose distances from the electronic device are less than the specified value.

When determining the IoT devices in the area having the specified angle that the electronic device has the authority to display, i.e., after the IoT devices within the area having the specified angle whose distances from the electronic device are less than the specified value are determined, the information of the IoT devices whose distance are less than the specified value can be received and displayed.

It should be noted that, when receiving and displaying the information of the IoT devices whose distances from the electronic device are less than the specified value, one implementation manner may be that the IoT devices within the area whose distances from the electronic device are less than the specified value send the relevant information of the device to a cloud server, and the cloud server then sends the received relevant information sent by the IoT devices to the electronic device for display. Another implementation may be that the IoT devices whose distances from the electronic device are less than the specified value establish connections with the electronic device, and send information related to the IoT devices to the electronic device for display after establishing the connection.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, based on the above embodiment of the electronic device, in this embodiment, it can be determined that the electronic device has the authority to display the IoT devices whose distances from the electronic device are less than the specified value by calculating the distance between each IoT device in the area and the electronic device. The information of the IoT devices whose distances from the electronic device are less than the specified value can be received and displayed. Accordingly, it can be more convenient for the user the user of the electronic device to obtain the required information of the IoT device, which improves the user experience.

Figure 7:
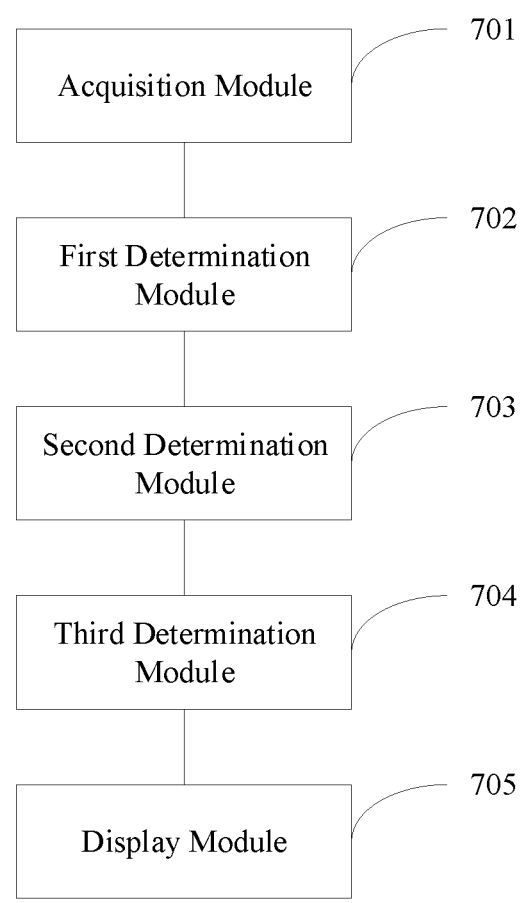
FIG. 7 is a schematic diagram of the electronic device according to another embodiment of the present disclosure.

As shown in FIG. 7, a schematic diagram of the electronic device according to another embodiment of the present disclosure is provided. The electronic device may be an intelligent device such as a smart phone, a tablet computer, or a VR device. The electronic device may include:

Acquisition module 701: configured to obtain orientation information of the electronic device.

When the user needs to obtain the relevant information of the IoT device through the electronic device, current orientation information of the electronic device may be first obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

First determination module 702: configured to determine an area having a specified angle based on the orientation information.

After the orientation information of the electronic device is obtained, an area having a specified angle can be determined based on the obtained orientation information with the electronic device being a center and the orientation of the electronic device being a centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

Second determination module 703: configured to identify the IoT devices within the area.

After the area having the specified angle is determined based on the orientation information of the electronic device, the IoT devices within the area having the specified angle can be further identified. There may be several IoT devices in the area having the specified angle.

It should be noted that, when identifying the IoT devices in the area, one implementation manner may be that the electronic device sends the determined information of the area having the specified angle to a cloud server, and the cloud server identifies the IoT devices within the area having the specified angle according to the information of the area having the specified angle, and feedbacks the information of the IoT devices within the area having the specified angle to the electronic device. The information of the IoT devices fed back by the cloud server may be the location information of the IoT devices.

Third determination module 704: configured to calculate a distance between each IoT device in the area and the electronic device.

After the IoT devices within the area are determined, it can be further determined whether the electronic device has the authority to display the IoT devices within the area.

When determining whether the electronic device has the authority to display the IoT devices in the display area, a distance between each IoT device in the area and the electronic device can be calculated first. One method to calculate the distance between each IoT device in the area and the electronic device may be that the electronic device obtains the location information of each IoT device in the area through a cloud server, and calculate the distance between each IoT device in the area and the electronic device based on the location information of the electronic device.

The third determination module 704 is further configured to determine that the electronic device has the authority to display the IoT devices whose distances from the electronic device are less than a specified value.

After calculating the distance between each IoT device within the area and the electronic device, the IoT devices whose distances from the electronic device are less than the specified value can be determined to be the IoT devices that the electronic device has the authority to display. For example, the IoT devices whose distances from the electronic device are less than 10 meters may be determined to be the IoT devices that the electronic device has the authority to display.

It should be noted that the specified value can be flexibly set according to the actual situation.

The third determining module 704 is also configured to obtain visual field direction information of the user who wears the electronic device.

After the IoT devices whose distances from the electronic device are less than the specified value are determined, the user's intention can be further combined to determine the IoT device required by the user more accurately.

When determining the user's intention, visual field direction information of the user who wears the electronic device can be first determined, that is, the direction of line of sight of the user. The information of the expected IoT device in the direction of the line of sight can be obtained through the user's intent determined by the line of sight direction.

The third determining module 704 is further configured to: based on the information of the visual field direction, determine that the electronic device has the authority to display the IoT device in the direction of the visual field among a plurality of IoT devices whose distances from the electronic device are less than the specified value.

After obtaining the information of the visual field direction of the user who wears the electronic device, the IoT device in the user's visual field direction whose distance from the electronic device is less than the specified value can be determined to be the IoT device that the electronic device has the authority to display.

Display module 705: configured to receive and display the information of the IoT device in the visual field direction.

When determining that the electronic device in the area having the specified angle area has the authority to display the IoT devices, i.e., after the IoT device within the area having the specified angle in the direction of the user's visual field whose distance from the electronic device is less than the specified value is determined, the information of the IoT devices in the direction of the user's visual field whose distance is less than the specified value may be received and displayed.

It should be noted that, when receiving and displaying the information of the IoT device in the direction of the user's visual field whose distance from the electronic device is less than the specified value, one implementation manner may be that the IoT device within the area whose distance from the electronic device is less than the specified value sends the relevant information of the device to a cloud server, and the cloud server then sends the received relevant information sent by the IoT device to the electronic device for display. Another implementation may be that the IoT device in the direction of the user's visual field whose distance from the electronic device is less than the specified value establishes a connection with the electronic device, and sends information related to the IoT device to the electronic device for display after establishing the connection.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, based on the above-mentioned embodiment of the electronic device, after determining the IoT devices whose distance from the electronic device are less than the specified value, the intent of the user who wears the electronic device can be further determined based on the information of the user's visual direction, and the IoT device in the direction of the user's visual field whose distance from the electronic device is less than the specified value can be determined to be the IoT device of which the user desires to obtain relevant information. Accordingly, it can be more convenient for the user of the electronic device to obtain the required information of the IoT device in time, which improves the user experience.

Specifically, in the foregoing embodiment, one implementation manner of obtaining the information of the visual field direction of the user who wears the electronic device may be: first, collecting the eye movement information of the user who wears the electronic device through a collection unit, then determining the information of the visual field direction of the user who wears the electronic device through a visual field direction information determination unit according to the eye movement information.

Specifically, when the collection unit collects the eye movement information of the user who wears the electronic device, the user's eyeball can be photographed through a camera of the electronic device to collect the user's eye movement information. For example, when the electronic device is a VR device, and the user wears the VR device, the user's eyeball can be photographed through the camera in the VR device, so that the user's eyeball movement information can be collected.

Figure 8:
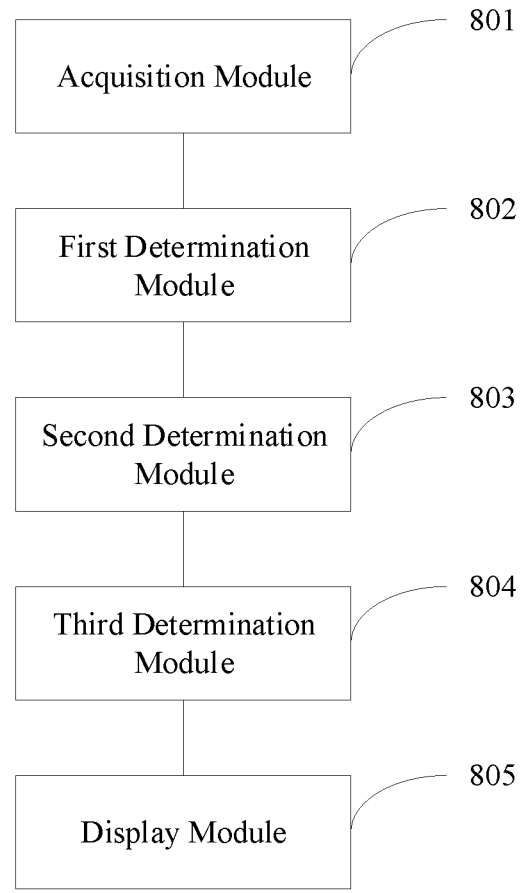
FIG. 8 is a schematic diagram of the electronic device according to another embodiment of the present disclosure.

As shown in FIG. 8, a schematic diagram of the electronic device according to another embodiment of the present disclosure is provided. The electronic device may be an intelligence device such as a smart phone, a tablet computer, a VR device. The electronic device may include:

Acquisition module 801: configured to obtain orientation information of the electronic device.

When the user needs to obtain the relevant information of the IoT device through the electronic device, current orientation information of the electronic device may be first obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

First determination module 802: configured to determine an area having a specified angle based on the orientation information.

After the orientation information of the electronic device is obtained, an area having a specified angle can be determined based on the obtained orientation information with the electronic device being a center and the orientation of the electronic device being a centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area having a central angle, e.g., 120°.

It should be noted that the specified angle can be flexibly set according to actual conditions. For example, different specified angles can be set according to different types of electronic devices, or different specified angles can be set according to different needs of the user.

Second determination module 803: configured to identify the IoT devices within the area.

After the area having the specified angle is determined based on the orientation information of the electronic device, the IoT devices within the area having the specified angle can be further identified. There may be several IoT devices in the area having the specified angle.

It should be noted that, when identifying the IoT devices in the area, one implementation manner may be that the electronic device sends the determined information of the area having the specified angle to a cloud server, and the cloud server identifies the IoT devices within the area having the specified angle according to the information of the area having the specified angle, and feedbacks the information of the IoT devices within the area having the specified angle to the electronic device. The information of the IoT devices fed back by the cloud server may be the location information of the IoT devices.

Third determination module 804: configured to determine a designated location within the area.

After the IoT devices within the area is determined, it can be further determined whether the electronic device has the authority to display the IoT devices within the area.

When determining whether the electronic device has the authority to display the IoT devices in the display area, it can be first determined whether there is a designated location within the area. The designated location may be flexibly set according to different needs. For example, a crossroad, a T-junction may be determined to be the designated location.

The third determination module 804 may be further configured to determine that the electronic device has the authority to display an IoT device at the designated location.

After determining the designated location within the area, an IoT device at the designated location can be determined to be the IoT device that the electronic device has the authority to display.

Display module 805: configured to receive and display the information of the IoT device at the designated location.

After determining the IoT device that the electronic device has the authority to display at the designated location of the area having the specified angle, the information of the IoT device at the designated location may be received and displayed.

It should be noted that, when receiving and displaying the information of the IoT device at the designated location, one implementation manner may be that the IoT device at the designated location sends the relevant information of the device to a cloud server, and the cloud server then sends the received relevant information sent by the IoT device to the electronic device for display. Another implementation may be that the IoT device at the designated location establishes a connection with the electronic device, and sends information related to the IoT device to the electronic device for display after establishing the connection.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, based on the above-mentioned embodiment of the electronic device, it can be determined that the electronic device has the authority to display the IoT device at the designated location by determining the designated location within the area, and the information of the IoT device at the designated location can be received and displayed. Accordingly, it can be more convenient for the user of the electronic device to obtain the required information of the IoT device in time, which improves the user experience.

Figure 9:
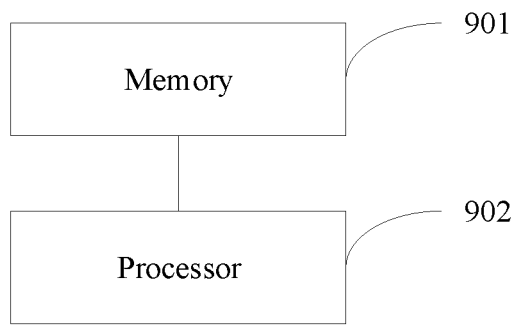
FIG. 9 is a schematic diagram of the electronic device according to another embodiment of the present disclosure.

As shown in FIG. 9, a schematic diagram of the electronic device according to another embodiment of the present disclosure is provided. The electronic device may be an intelligent device such as a smart phone, a tablet computer, or a VR device. The electronic device may include: a memory 901, a processor 902 and a computer program stored on the memory 901 and executable on the processor 902. When the program is executed, the processor 902 is configured to implement: obtaining orientation information of electronic device; based on the orientation information, determining an area having a specified angle; identifying the IoT devices within the area; confirming that the electronic device has the authority to display the IoT devices; and receiving and displaying information of the IoT devices.

When the user needs to obtain the relevant information of the IoT devices through the electronic device, the current orientation information of the electronic device may be first obtained; that is, the orientation of the electronic device may be first determined. For example, the current orientation of the electronic device may be 40° North-East, or the current orientation of the electronic device may be 20° West-South, and so on.

It should be noted that, when obtaining the orientation information of the electronic device, one implementation manner may be obtaining through a sensor of the electronic device, such as a magnetoresistive sensor.

After the orientation information of the electronic device is obtained, the area having the specified angle can be further determined based on the obtained orientation information, with the electronic device being the center and the orientation of the electronic device being the centerline. For example, when the specified angle is 120° and the orientation of the electronic device is 40° North-East, an area having an angle of 120° can be determined by setting the electronic device to be the center and the 40° North-East orientation to be the centerline. In some embodiments, the area may be a fan-shaped area with a central angle, e.g., 120°.

It should be noted that the specified angle can be flexibly set according to actual conditions. For example, different specified angles can be set according to different types of electronic devices, or different specified angles can be set according to different needs of the user.

After the area having the specified angle is determined based on the orientation information of the electronic device, the IoT devices within the area having the specified angle can be further identified. There may be several IoT devices within the area having the specified angle.

It should be noted that, when identifying the IoT devices in the area, one implementation manner may be that the electronic device sends the determined information of the area having the specified angle to a cloud server, and the cloud server identifies the IoT devices within the area having the specified angle according to the information of the area having the specified angle, and feedbacks the information of the IoT devices within the area having the specified angle to the electronic device. The information of the IoT devices fed back by the cloud server may be the location information of the IoT devices.

After the IoT devices within the area are determined, it can be further determined whether the electronic device has the authority to display the IoT devices within the area.

When determining that the electronic device has the authority to display the IoT devices within the area having the specified angle, the information of the authorized IoT devices may be received and displayed.

It should be noted that, when receiving and displaying the information of the IoT devices, one implementation manner may be that the authorized IoT devices send the relevant information of the devices to a cloud server, and the cloud server then sends the received relevant information sent by the IoT devices to the electronic device for display. Another implementation may be that the IoT devices within the area that the electronic device has the authority to display establish connections with the electronic device, and sends information related to the IoT devices to the electronic device for display after establishing the connection.

In addition, it should be noted that the relevant information sent by the IoT devices may be different information of the IoT devices according to the actual situation. For example, different information can be sent according to different types of IoT devices, or different IoT device information can be sent according to different needs of the user.

In summary, in the above embodiment, when the user needs to obtain the relevant information of the IoT devices through the electronic device, orientation information of the electronic device may be first obtained, then an area having the specified angle can be determined based on the orientation information. The IoT devices within the area can be identified, and it can be determined whether the electronic device has the authority to display the IoT devices. Finally, the information of the IoT devices may be received and displayed. In the present disclosure, the IoT devices of which the electronic device can obtain information can be identified based on the orientation of the electronic device, the specified angle, and the authority to display the IoT device. Accordingly, it is convenient for the user of the electronic device to timely obtain the required information of the IoT devices, which improves the user experience.

It should be noted that the embodiments of the present disclosure are described in a progressive manner. Each embodiment focuses on the differences from other embodiments. The same and similar parts between the embodiments may be referred to each other. can. For the device or system embodiments, since they are essentially similar to the method embodiment, the description is relatively simple. For the related parts, reference with the description of the method embodiments can be made.

It should also be noted that in the present disclosure, relational terms such as "first", and "second" are used only to distinguish one entity or operation from another entity or operation, and do not necessarily require or imply any actual relationship or order among these entities or operations. Moreover, the terms "include" or any other variant thereof are intended to cover non-exclusive inclusion, so that a process, method, article, or device that includes a series of elements includes not only those elements, but also those not explicitly listed or other elements that are inherent to this process, method, article, or equipment. Without further restrictions, the element defined by the sentence "include one" does not exclude that there are other identical elements in the process, method, article or device that includes the element.

The steps of the method or algorithm described in conjunction with the embodiments disclosed herein may be implemented directly by hardware, a software module executed by a processor, or a combination of both.

When the above-mentioned methods or algorithms are implemented in the form of a software function module, it can be sold or used as an independent computer software product, or it can be stored in a computer-readable storage medium that includes several instructions for a computer device (which may be a personal computer, server, or network device, etc.) to execute all or part of the methods or algorithms described in the embodiments of the present disclosure. The software module can be stored in a storage medium known in the field of technology such as a random-access memory (RAM), memory, a read-only memory (ROM), an electrically programmable read-only memory (ROM), an electrically erasable programmable read-only memory ($E^2PROM$), a register, a hard disk, a flash drive, or a CD-ROM.

The above description of the disclosed embodiments enables those skilled in the art to implement or use the present disclosure. Various modifications to these embodiments can be apparent to those skilled in the art, and the general principles defined herein can be implemented in other embodiments without departing from the spirit or scope of the disclosure. Therefore, the disclosure will not be limited to the embodiments of the present disclosure, but should conform to the widest scope consistent with the principles and novel features of the present disclosure.

What is claimed is:

1. An information processing method for an electronic device, comprising:
    obtaining orientation information of the electronic device;
    determining an area having a specified angle based on the orientation information;
    identifying one or more Internet of Things (IoT) devices in the area without using an image sensor or pairing process with the electronic device, including:
        sending information of the area having the specified angle to a cloud server; and
        receiving information of the one or more IoT devices in the area from the cloud server, the one or more IoT devices in the area being identified by the cloud server based on the information of the area having the specified angle;
    determining that the electronic device has an authority to display the information of the one or more IoT devices; and
    displaying the information of the one or more IoT devices.

2. The method according to claim 1, wherein determining that the electronic device has the authority to display the information of the one or more IoT devices comprises:
    calculating a distance between each of the one or more IoT devices in the area and the electronic device; and
    in response to the distance between one of the one or more IoT devices and the electronic device being less than a specified value, determining that the electronic device has the authority to display the information of the one of the one or more IoT devices.

3. The method according to claim 2, wherein determining that the electronic device has the authority to display the information of the one or more IoT devices further comprises:
- obtaining information of visual field direction of a user of the electronic device; and
- determining an IoT device of which the electronic device has the authority to display the information in the visual field direction among the one or more IoT devices with distances from the electronic device being less than the specified value.

4. The method according to claim 1, wherein determining that the electronic device has the authority to display the information of the one or more IoT devices comprises:
- determining a designated location within the area; and
- determining that the electronic device has the authority to display information of an IoT device at the designated location.

5. The method according to claim 3, wherein obtaining the information of the visual field direction of the user of the electronic device comprises:
- collecting eye movement information of the user; and
- determining the information of the visual field direction of the user based on the eye movement information.

6. The method according to claim 5, wherein:
the electronic device comprises:
- a camera; and collecting the eye movement information of the user comprises:
- collecting the eye movement information of the user through the camera.

7. The method according to claim 1, wherein the specified angle is less than or equal to 120°.

8. The method according to claim 2, wherein the specified value is less than or equal to 10 meters.

9. The method according to claim 1, wherein a centerline forming the area having the specified angle originates from the electronic device and lines up with the orientation of the electronic device.

10. The method according to claim 1, wherein:
- the information of the one or more IoT devices in the area from the cloud server is sent from the one or more IoT devices in the area to the cloud server; and
- the information of the one or more IoT devices in the area from the cloud server comprises location information of the one or more IoT devices in the area.

11. An electronic device, comprising:
- an acquisition module configured to obtain orientation information of the electronic device;
- a first determination module configured to determine an area having a specified angle based on the orientation information;
- a second determination module configured to identify one or more Internet of Things (IoT) devices in the area without using an image sensor or pairing process with the electronic device, including:
  - sending information of the area having the specified angle to a cloud server; and
  - receiving information of the one or more IoT devices in the area from the cloud server, the one or more IoT devices in the area being identified by the cloud server based on the information of the area having the specified angle;
- a third determination module configured to determine that the electronic device has the authority to display the information of the one or more IoT devices; and
- a display module configured to display the information of the one or more IoT devices.

12. The electronic device according to claim 11, wherein the third determination module is further configured to:
- calculate a distance between each of the one or more IoT devices in the area and the electronic device; and
- in response to the distance between one of the one or more IoT device in the area and the electronic device being less than a specified value, determine that the electronic device has the authority to display the information of the one of the one or more IoT devices.

13. The electronic device according to claim 11, wherein the third determination module is further configured to:
- obtain visual field direction information of a user of the electronic device, the visual field direction information being a direction of line of sight of the user.

14. An electronic device, comprising:
a memory; and
a processor, the memory storing a computer program executable on the processor, and when executed, the processor is configured to:
- obtain orientation information of the electronic device;
- determine an area having a specified angle based on the orientation information;
- identify one or more Internet of Things (IoT) devices in the area without using an image sensor or pairing process with the electronic device, including:
  - sending information of the area having the specified angle to a cloud server; and
  - receiving information of the one or more IoT devices in the area from the cloud server, the one or more IoT devices in the area being identified by the cloud server based on the information of the area having the specified angle;
- determine that the electronic device has an authority to display information of the one or more IoT devices; and
- display the information of the one or more IoT devices.

15. The electronic device according to claim 14, wherein the processor is further configured to:
- calculate a distance between each of the one or more IoT devices in the area and the electronic device; and
- in response to the distance between one of the one or more IoT devices and the electronic device being less than a specified value, determine that the electronic device has the authority to display the information of the one of the one or more IoT devices.

16. The electronic device according to claim 14, wherein the processor is further configured to:
- obtain information of visual field direction of a user of the electronic device; and
- determine an IoT device of which the electronic device has the authority to display the information in the visual field direction among the one or more IoT devices with distances from the electronic device being less than the specified value.

17. The electronic device according to claim 14, wherein the processor is further configured to:
- determine a designated location within the area; and
- determine that the electronic device has the authority to display information of an IoT device at the designated location.

18. The electronic device according to claim 16, wherein the processor is further configured to:
- collect eye movement information of the user; and
- determine the information of the visual field direction of the user based on the eye movement information.

19. The electronic device according to claim 18, further comprising:
 a camera.

20. The electronic device according to claim 14, wherein:
 the information of the one or more IoT devices in the area from the cloud server is sent from the one or more IoT devices in the area to the cloud server; and
 the information of the one or more IoT devices in the area from the cloud server comprises location information of the one or more IoT devices in the area.

* * * * *